US008197952B2

(12) United States Patent
Yu et al.

(10) Patent No.: US 8,197,952 B2
(45) Date of Patent: *Jun. 12, 2012

(54) HIGH STARCH LIGHT WEIGHT GYPSUM WALLBOARD

(75) Inventors: Qiang Yu, Grayslake, IL (US); Weixin D. Song, Lake Forest, IL (US); Michael R. Lynn, Arlington Heights, IL (US)

(73) Assignee: United States Gypsum Company, Chicago, IL (US)

( * ) Notice: Subject to any disclaimer, the term of this patent is extended or adjusted under 35 U.S.C. 154(b) by 8 days.

This patent is subject to a terminal disclaimer.

(21) Appl. No.: 12/795,125

(22) Filed: Jun. 7, 2010

(65) Prior Publication Data

US 2010/0239886 A1    Sep. 23, 2010

Related U.S. Application Data

(63) Continuation of application No. 11/449,177, filed on Jun. 7, 2006, now Pat. No. 7,731,794.

(60) Provisional application No. 60/688,839, filed on Jun. 9, 2005.

(51) Int. Cl.
  *B32B 13/00* (2006.01)
  *C04B 11/00* (2006.01)

(52) U.S. Cl. .......... 428/703; 428/400; 442/386; 156/39; 106/772; 106/778

(58) Field of Classification Search .................. 428/703, 428/400; 442/386; 106/772, 778; 156/39
See application file for complete search history.

(56) References Cited

U.S. PATENT DOCUMENTS

| | | | |
|---|---|---|---|
| 1,500,452 A | 7/1924 | Haggerty |
| 1,702,729 A | 2/1929 | Hite |
| 1,769,519 A | 7/1930 | King |
| 1,868,671 A | 7/1932 | Nelson |
| 1,937,472 A | 11/1933 | Ericson |
| 1,953,589 A | 4/1934 | Camp |
| 1,971,900 A | 8/1934 | Cerveny et al. |
| 2,078,199 A | 4/1937 | King |
| 2,083,961 A | 6/1937 | New |
| 2,207,339 A | 7/1940 | Camp |
| 2,213,603 A | 9/1940 | Young et al. |
| 2,322,194 A | 6/1943 | King |
| 2,340,535 A | 2/1944 | Jenkins |
| 2,342,574 A | 2/1944 | Denning |
| 2,388,543 A | 11/1945 | Hoggatt |
| 2,516,632 A | 6/1950 | Kesler et al. |
| 2,526,066 A | 10/1950 | Croce |
| 2,698,818 A | 1/1955 | Staerkle |
| 2,733,238 A | 1/1956 | Kerr et al. |
| 2,744,022 A | 5/1956 | Croce |
| 2,803,575 A | 8/1957 | Riddell et al. |
| 2,845,417 A | 7/1958 | Kesler et al. |
| 2,853,394 A | 9/1958 | Riddell et al. |
| 2,871,146 A | 1/1959 | Etheridge |
| 2,884,413 A | 4/1959 | Kerr et al. |
| 3,179,529 A | 4/1965 | Hikey et al. |
| 3,260,027 A | 7/1966 | Page et al. |
| 3,359,146 A | 12/1967 | Lane et al. |
| 3,382,636 A | 5/1968 | Green |
| 3,423,238 A | 1/1969 | Weiland |
| 3,454,456 A | 7/1969 | Willey |
| 3,459,571 A | 8/1969 | Shannon |
| 3,513,009 A | 5/1970 | Sauer et al. |
| 3,573,947 A | 4/1971 | Kinkade |
| 3,616,173 A | 10/1971 | Green et al. |
| 3,649,319 A | 3/1972 | Smith |
| 3,666,581 A | 5/1972 | Lane |
| 3,674,726 A | 7/1972 | Kirk |
| 3,719,513 A | 3/1973 | Bragg et al. |
| 3,797,758 A | 3/1974 | Cherdron |
| 3,830,687 A | 8/1974 | Re et al. |
| 3,839,059 A | 10/1974 | Rothfelder et al. |
| 3,847,630 A | 11/1974 | Compernass et al. |
| 3,908,062 A | 9/1975 | Roberts |
| 3,913,571 A | 10/1975 | Bayer et al. |
| 3,944,698 A | 3/1976 | Dierks et al. |
| 3,981,831 A | 9/1976 | Markusch et al. |
| 3,988,199 A | 10/1976 | Hillmer et al. |
| 3,989,534 A | 11/1976 | Plunguian et al. |
| 3,993,822 A | 11/1976 | Knauf et al. |
| 4,009,062 A | 2/1977 | Long |
| 4,011,392 A | 3/1977 | Rudolph et al. |

(Continued)

FOREIGN PATENT DOCUMENTS

AU           486746           11/1975

(Continued)

OTHER PUBLICATIONS

U.S. Appl. No. 11/267,125, filed Nov. 4, 2005, Baig.
U.S. Appl. No. 11/592,481, filed Nov. 2, 2006, Yu et al.
U.S. Appl. No. 11/906,479, filed Oct. 2, 2007, Yu.
AZom.com, AZO Materials Particle Size—US Sieve Series and Tyler Mesh Size Equivalents, Retrieved on Jan. 21, 2011 from http://www.azom.com/Details.asp?ArticleID=1417.
Grace Specialty Vermiculite, "VCX™ Vermiculite Ore Concentrate", W.R. Grace & Co., Conn. USA (2008).
Grace Specialty Vermiculite, "Zonolite$^R$ #3 Agricultural/Horticultural Vermiculite" W.R. Grace & Co., Conn. USA (1999).
Potter, Michael J., "Vermiculite" US Geological Survey Minerals Yearbook-2001, 5 total pages (p. 82.1-82.3 and two pages of tables) (2001).
Virginia Vermiculite LLC, "Grade No. 4 Vermiculite Concentrate", VA, USA (Jan. 2008).

(Continued)

*Primary Examiner* — Paul Marcantoni
(74) *Attorney, Agent, or Firm* — Leydig Voit & Mayer, Ltd.; Philip T. Petti; David F. Janci

(57) ABSTRACT

The invention generally provides gypsum-containing slurries including stucco, naphthalenesulfonate dispersant, and pregelatinized starch. The naphthalenesulfonate dispersant is present in an amount of about 0.1%-3.0% by weight based on the weight of dry stucco. The pregelatinized starch is present in an amount of at least about 0.5% by weight up to about 10% by weight of pregelatinized starch by weight based on the weight of dry stucco in the formulation. Other slurry additives can include trimetaphosphate salts, accelerators, binders, paper fiber, glass fiber, and other known ingredients. The invention also comprises the gypsum-containing products made with such slurries, for example, gypsum wallboard, and a method of making gypsum wallboard.

20 Claims, No Drawings

U.S. PATENT DOCUMENTS

| | | |
|---|---|---|
| 4,019,920 A | 4/1977 | Burkard et al. |
| 4,021,257 A | 5/1977 | Bernett |
| 4,048,434 A | 9/1977 | Speakman |
| 4,051,291 A | 9/1977 | Long |
| 4,061,611 A | 12/1977 | Glowaky et al. |
| 4,073,658 A | 2/1978 | Ohtani et al. |
| 4,097,422 A | 6/1978 | Markusch |
| 4,097,423 A | 6/1978 | Dieterich |
| 4,133,784 A | 1/1979 | Otey et al. |
| 4,174,230 A | 11/1979 | Hashimoto et al. |
| 4,184,887 A | 1/1980 | Lange et al. |
| 4,190,547 A | 2/1980 | Mahnke et al. |
| 4,195,110 A | 3/1980 | Dierks et al. |
| 4,233,368 A | 11/1980 | Baehr et al. |
| 4,234,345 A | 11/1980 | Fässle |
| 4,237,260 A | 12/1980 | Lange et al. |
| 4,265,964 A | 5/1981 | Burkhart |
| 4,265,979 A | 5/1981 | Baehr et al. |
| 4,309,391 A | 1/1982 | O'Neill |
| 4,327,146 A | 4/1982 | White |
| 4,328,178 A | 5/1982 | Kossatz |
| 4,392,896 A | 7/1983 | Sakakibara |
| 4,451,649 A | 5/1984 | Teubner et al. |
| 4,452,978 A | 6/1984 | Eastman |
| 4,487,864 A | 12/1984 | Bermudez et al. |
| 4,518,652 A | 5/1985 | Willoughby |
| 4,533,528 A | 8/1985 | Zaskalicky |
| 4,573,534 A | 3/1986 | Baker et al. |
| 4,613,627 A | 9/1986 | Sherman et al. |
| 4,624,574 A | 11/1986 | Mills et al. |
| 4,647,486 A | 3/1987 | Ali |
| 4,654,085 A | 3/1987 | Schinski |
| 4,722,866 A | 2/1988 | Wilson et al. |
| 4,725,477 A | 2/1988 | Kole et al. |
| 4,837,314 A | 6/1989 | Eastman |
| 4,842,786 A | 6/1989 | Betzner |
| 4,853,085 A | 8/1989 | Johnstone et al. |
| 4,939,192 A | 7/1990 | T'sas |
| 4,965,031 A | 10/1990 | Conroy |
| 4,966,739 A | 10/1990 | Stipek et al. |
| 5,037,929 A | 8/1991 | Rajagopalan et al. |
| 5,041,333 A | 8/1991 | Conroy |
| 5,080,717 A | 1/1992 | Young |
| 5,085,929 A | 2/1992 | Bruce et al. |
| 5,093,093 A | 3/1992 | Koslowski |
| 5,116,671 A | 5/1992 | Bruce et al. |
| 5,135,805 A | 8/1992 | Sellers et al. |
| 5,154,874 A | 10/1992 | Koslowski |
| 5,158,612 A | 10/1992 | Savoly et al. |
| 5,171,366 A | 12/1992 | Richards et al. |
| 5,207,830 A | 5/1993 | Cowan et al. |
| 5,227,100 A | 7/1993 | Koslowski et al. |
| 5,302,308 A | 4/1994 | Roe |
| 5,342,566 A | 8/1994 | Schäfer et al. |
| 5,366,550 A | 11/1994 | Schad |
| 5,385,607 A | 1/1995 | Kiesewetter et al. |
| 5,395,438 A | 3/1995 | Baig et al. |
| 5,432,215 A | 7/1995 | Girg et al. |
| 5,449,533 A | 9/1995 | Morizane |
| 5,534,059 A | 7/1996 | Immordino, Jr. |
| 5,558,710 A | 9/1996 | Baig |
| 5,573,333 A | 11/1996 | Dahlman |
| 5,575,840 A | 11/1996 | DeWacker |
| 5,575,844 A | 11/1996 | Bradshaw |
| 5,595,595 A | 1/1997 | Glenn |
| 5,643,510 A | 7/1997 | Sucech |
| 5,660,465 A | 8/1997 | Mason |
| 5,660,900 A | 8/1997 | Andersen et al. |
| 5,683,625 A | 11/1997 | Berthiaume et al. |
| 5,683,635 A | 11/1997 | Sucech et al. |
| 5,733,367 A | 3/1998 | Soeda et al. |
| 5,746,822 A | 5/1998 | Espinoza et al. |
| 5,798,010 A | 8/1998 | Richards et al. |
| 5,798,425 A | 8/1998 | Albrecht et al. |
| 5,810,956 A | 9/1998 | Tanis et al. |
| 5,817,262 A | 10/1998 | Englert |
| 5,871,857 A | 2/1999 | Alhamad |
| 5,876,563 A | 3/1999 | Greenwood |
| 5,879,446 A | 3/1999 | Patel et al. |
| 5,922,447 A | 7/1999 | Baig |
| 5,945,208 A | 8/1999 | Richards et al. |
| 5,962,119 A | 10/1999 | Chan |
| 6,051,700 A | 4/2000 | Wang |
| 6,054,088 A | 4/2000 | Alhamad |
| 6,059,444 A | 5/2000 | Johnson et al. |
| 6,110,271 A | 8/2000 | Skaggs et al. |
| 6,110,575 A | 8/2000 | Haga |
| 6,162,288 A | 12/2000 | Kindt et al. |
| 6,162,839 A | 12/2000 | Klauck et al. |
| 6,171,388 B1 | 1/2001 | Jobbins |
| 6,171,655 B1 | 1/2001 | Shintome |
| 6,221,521 B1 | 4/2001 | Lynn et al. |
| 6,227,186 B1 | 5/2001 | Seidl et al. |
| 6,231,970 B1 | 5/2001 | Andersen et al. |
| 6,241,815 B1 | 6/2001 | Bonen |
| 6,290,769 B1 | 9/2001 | Carkner |
| 6,299,970 B1 | 10/2001 | Richards et al. |
| 6,309,740 B1 | 10/2001 | Shu et al. |
| 6,319,312 B1 | 11/2001 | Luongo |
| 6,334,280 B1 | 1/2002 | Frappart et al. |
| 6,340,388 B1 | 1/2002 | Luongo |
| 6,340,389 B1 | 1/2002 | Klus |
| 6,342,284 B1 | 1/2002 | Yu et al. |
| 6,387,171 B1 | 5/2002 | Taylor et al. |
| 6,387,172 B1 | 5/2002 | Yu et al. |
| 6,391,958 B1 | 5/2002 | Luongo |
| 6,398,864 B1 | 6/2002 | Przybysz et al. |
| 6,406,535 B1 | 6/2002 | Shintome |
| 6,406,537 B1 | 6/2002 | Immordino |
| 6,409,819 B1 | 6/2002 | Ko |
| 6,409,824 B1 | 6/2002 | Veeramasuneni et al. |
| 6,409,825 B1 | 6/2002 | Yu et al. |
| 6,443,258 B1 | 9/2002 | Putt et al. |
| 6,475,313 B1 | 11/2002 | Peterson et al. |
| 6,481,171 B2 | 11/2002 | Yu et al. |
| 6,485,821 B1 | 11/2002 | Bruce et al. |
| 6,524,679 B2 | 2/2003 | Hauber et al. |
| 6,533,854 B2 | 3/2003 | Kesselring et al. |
| 6,572,698 B1 | 6/2003 | Ko |
| 6,613,424 B1 | 9/2003 | Putt et al. |
| 6,632,550 B1 | 10/2003 | Yu et al. |
| 6,673,144 B2 | 1/2004 | Immordino, Jr. et al. |
| 6,680,127 B2 | 1/2004 | Capps |
| 6,706,112 B2 | 3/2004 | Sironi et al. |
| 6,706,128 B2 | 3/2004 | Sethuraman |
| 6,711,872 B2 | 3/2004 | Anderson |
| 6,743,830 B2 | 6/2004 | Soane et al. |
| 6,746,781 B2 | 6/2004 | Francis et al. |
| 6,773,639 B2 | 8/2004 | Moyes et al. |
| 6,774,146 B2 | 8/2004 | Savoly et al. |
| 6,777,517 B1 | 8/2004 | Albrecht et al. |
| 6,780,356 B1 | 8/2004 | Putt et al. |
| 6,780,903 B2 | 8/2004 | Peltonen et al. |
| 6,783,587 B2 | 8/2004 | Sethuraman et al. |
| 6,800,131 B2 | 10/2004 | Yu et al. |
| 6,814,799 B2 | 11/2004 | Sasage et al. |
| 6,815,049 B2 | 11/2004 | Veeramasuneni et al. |
| 6,822,033 B2 | 11/2004 | Yu et al. |
| 6,832,652 B1 | 12/2004 | Dillenbeck et al. |
| 6,841,232 B2 | 1/2005 | Tagge et al. |
| 6,846,357 B2 | 1/2005 | Reddy et al. |
| 6,878,321 B2 | 4/2005 | Hauber et al. |
| 6,893,752 B2 | 5/2005 | Veeramasuneni et al. |
| 6,902,797 B2 | 6/2005 | Pollock et al. |
| 6,964,704 B2 | 11/2005 | Cox et al. |
| 6,983,821 B2 | 1/2006 | Putt et al. |
| 7,048,794 B2 | 5/2006 | Tagge et al. |
| 7,056,582 B2 | 6/2006 | Carbo et al. |
| 7,090,883 B2 | 8/2006 | Phipps |
| 7,101,426 B2 | 9/2006 | Tagge et al. |
| 7,105,587 B2 | 9/2006 | Tagge et al. |
| 7,172,403 B2 | 2/2007 | Burke |
| 7,217,754 B2 | 5/2007 | Koloski et al. |
| 7,244,304 B2 | 7/2007 | Yu et al. |
| 7,285,586 B2 | 10/2007 | Helbling et al. |
| 7,347,895 B2 | 3/2008 | Dubey |
| 7,364,015 B2 | 4/2008 | Englert et al. |

| | | |
|---|---|---|
| 7,413,603 B2 | 8/2008 | Miller et al. |
| 7,422,638 B2 | 9/2008 | Trksak et al. |
| 7,425,236 B2 | 9/2008 | Yu et al. |
| 7,455,728 B2 | 11/2008 | Losch et al. |
| 7,524,386 B2 | 4/2009 | George et al. |
| 7,544,242 B2 | 6/2009 | Liu et al. |
| 7,572,328 B2 | 8/2009 | Lettkeman et al. |
| 7,572,329 B2 | 8/2009 | Liu et al. |
| 7,608,347 B2 | 10/2009 | Lettkeman et al. |
| 7,637,996 B2 | 12/2009 | Blackburn et al. |
| 7,644,548 B2 | 1/2010 | Guevara et al. |
| 7,696,253 B2 | 4/2010 | Wantling et al. |
| 7,708,847 B2 | 5/2010 | Sahay |
| 7,731,794 B2 | 6/2010 | Yu et al. |
| 7,736,720 B2 | 6/2010 | Yu et al. |
| 7,758,980 B2 | 7/2010 | Yu et al. |
| 7,767,019 B2 | 8/2010 | Liu et al. |
| 7,771,851 B2 | 8/2010 | Song et al. |
| 7,776,461 B2 | 8/2010 | Blackburn et al. |
| 7,776,462 B2 | 8/2010 | Liu et al. |
| 7,803,226 B2 | 9/2010 | Wang et al. |
| 7,811,685 B2 | 10/2010 | Wang et al. |
| 7,815,730 B2 | 10/2010 | Wang et al. |
| 7,819,993 B2 | 10/2010 | Seki et al. |
| 7,842,218 B2 | 11/2010 | Bonetto et al. |
| 7,851,057 B2 | 12/2010 | Englert et al. |
| 7,875,114 B2 | 1/2011 | Wittbold et al. |
| 7,892,472 B2 | 2/2011 | Veeramasuneni et al. |
| 7,932,193 B2 | 4/2011 | Kajander |
| 7,932,308 B2 | 4/2011 | Lettkeman et al. |
| 7,964,034 B2 | 6/2011 | Yu et al. |
| 2001/0001218 A1 | 5/2001 | Luongo |
| 2002/0017222 A1 | 2/2002 | Luongo |
| 2002/0096278 A1 | 7/2002 | Foster et al. |
| 2002/0108532 A1 | 8/2002 | Kesselring et al. |
| 2002/0112651 A1 | 8/2002 | Yu et al. |
| 2003/0019176 A1 | 1/2003 | Anderson |
| 2003/0073798 A1 | 4/2003 | Kightlinger et al. |
| 2003/0084980 A1 | 5/2003 | Seufert et al. |
| 2003/0092784 A1 | 5/2003 | Tagge et al. |
| 2003/0150360 A1 | 8/2003 | Huntsman et al. |
| 2004/0005484 A1 | 1/2004 | Veeramasuneni et al. |
| 2004/0026002 A1 | 2/2004 | Weldon et al. |
| 2004/0045481 A1 | 3/2004 | Sethuraman |
| 2004/0055720 A1 | 3/2004 | Torras, Sr. et al. |
| 2004/0065232 A1 | 4/2004 | Lykke |
| 2004/0092190 A1 | 5/2004 | Bruce et al. |
| 2004/0092625 A1 | 5/2004 | Pollock et al. |
| 2004/0107872 A1 | 6/2004 | Matsuyama et al. |
| 2004/0121152 A1 | 6/2004 | Toas |
| 2004/0131714 A1 | 7/2004 | Burke |
| 2004/0149170 A1 | 8/2004 | Moran |
| 2004/0152379 A1 | 8/2004 | McLarty, III et al. |
| 2004/0209071 A1 | 10/2004 | Carbo et al. |
| 2004/0231916 A1 | 11/2004 | Englert et al. |
| 2004/0242861 A1 | 12/2004 | Kightlinger et al. |
| 2004/0244646 A1 | 12/2004 | Larsen et al. |
| 2005/0019618 A1 | 1/2005 | Yu et al. |
| 2005/0048190 A1 | 3/2005 | Tksak et al. |
| 2005/0061203 A1 | 3/2005 | Helbling et al. |
| 2005/0126437 A1 | 6/2005 | Tagge et al. |
| 2005/0142348 A1 | 6/2005 | Kajander et al. |
| 2005/0150427 A1 | 7/2005 | Liu et al. |
| 2005/0181693 A1 | 8/2005 | Kajander |
| 2005/0191465 A1 | 9/2005 | Mayers et al. |
| 2005/0219938 A1 | 10/2005 | Rigaudon et al. |
| 2005/0223949 A1 | 10/2005 | Bailey, Jr. et al. |
| 2005/0241541 A1 | 11/2005 | Hohn et al. |
| 2005/0250858 A1 | 11/2005 | Wantling et al. |
| 2005/0250888 A1 | 11/2005 | Lettkeman et al. |
| 2005/0263925 A1 | 12/2005 | Heseltine et al. |
| 2005/0281999 A1 | 12/2005 | Hofmann et al. |
| 2006/0029785 A1 | 2/2006 | Wang et al. |
| 2006/0054060 A1 | 3/2006 | Dubey |
| 2006/0090674 A1 | 5/2006 | Fukuda et al. |
| 2006/0150868 A1 | 7/2006 | Spickemann et al. |
| 2006/0162839 A1 | 7/2006 | Seki et al. |
| 2006/0278127 A1 | 12/2006 | Liu et al. |
| 2006/0278128 A1 | 12/2006 | Liu et al. |
| 2006/0278129 A1 | 12/2006 | Liu et al. |
| 2006/0278132 A1 | 12/2006 | Yu et al. |
| 2006/0278133 A1 | 12/2006 | Yu et al. |
| 2006/0280898 A1 | 12/2006 | Lettkeman et al. |
| 2006/0280899 A1 | 12/2006 | Liu et al. |
| 2007/0022913 A1 | 2/2007 | Wang et al. |
| 2007/0032393 A1 | 2/2007 | Patel et al. |
| 2007/0048490 A1 | 3/2007 | Yu et al. |
| 2007/0056478 A1 | 3/2007 | Miller et al. |
| 2007/0059513 A1 | 3/2007 | Yu et al. |
| 2007/0082170 A1 | 4/2007 | Colbert et al. |
| 2007/0102237 A1 | 5/2007 | Baig |
| 2007/0221098 A1 | 9/2007 | Wolbers et al. |
| 2007/0251628 A1 | 11/2007 | Yu et al. |
| 2007/0255032 A1 | 11/2007 | Bichler et al. |
| 2008/0000392 A1 | 1/2008 | Blackburn et al. |
| 2008/0060316 A1 | 3/2008 | Fukuda et al. |
| 2008/0066651 A1 | 3/2008 | Park |
| 2008/0070026 A1 | 3/2008 | Yu et al. |
| 2008/0087366 A1 | 4/2008 | Yu et al. |
| 2008/0090068 A1 | 4/2008 | Yu |
| 2008/0148997 A1 | 6/2008 | Blackburn et al. |
| 2008/0190062 A1 | 8/2008 | Engbrecht et al. |
| 2008/0227891 A1 | 9/2008 | Jarvie et al. |
| 2008/0286609 A1 | 11/2008 | Surace et al. |
| 2008/0299413 A1 | 12/2008 | Song et al. |
| 2008/0308968 A1 | 12/2008 | Immordino, Jr. |
| 2009/0010093 A1 | 1/2009 | Sethuraman et al. |
| 2009/0011207 A1 | 1/2009 | Dubey |
| 2009/0053544 A1 | 2/2009 | Sethuraman |
| 2009/0123727 A1 | 5/2009 | Martin et al. |
| 2009/0126300 A1 | 5/2009 | Fujiwara et al. |
| 2009/0130452 A1 | 5/2009 | Surace et al. |
| 2009/0151602 A1 | 6/2009 | Francis |
| 2009/0156080 A1 | 6/2009 | Finch et al. |
| 2009/0162602 A1 | 6/2009 | Cottier et al. |
| 2009/0169864 A1 | 7/2009 | Wang et al. |
| 2009/0169878 A1 | 7/2009 | Rigaudon et al. |
| 2010/0031853 A1 | 2/2010 | Visocekas et al. |
| 2010/0075166 A1 | 3/2010 | Gilley |
| 2010/0075167 A1 | 3/2010 | Gilley et al. |
| 2010/0088984 A1 | 4/2010 | Guevara et al. |
| 2010/0136269 A1 | 6/2010 | Andersen et al. |
| 2010/0139528 A1 | 6/2010 | Yu et al. |
| 2010/0143682 A1 | 6/2010 | Shake et al. |
| 2010/0221402 A1 | 9/2010 | Wang et al. |
| 2011/0009564 A1 | 1/2011 | Wang et al. |
| 2011/0054053 A1 | 3/2011 | Lee et al. |
| 2011/0132235 A1 | 6/2011 | Yu et al. |

FOREIGN PATENT DOCUMENTS

| | | |
|---|---|---|
| CL | 710-1995 | 11/1995 |
| CL | 1895-1998 | 3/1999 |
| CL | 1957-2003 | 6/2004 |
| CL | 1435-2006 | 9/2006 |
| CL | 1436-2006 | 9/2006 |
| CL | 2217-06 | 11/2006 |
| CL | 2289-2006 | 4/2007 |
| CL | 910-2007 | 5/2007 |
| CL | 3124-07 | 3/2008 |
| CN | 1237148 A | 12/1999 |
| EP | 0216497 A2 | 4/1987 |
| EP | 0409781 A2 | 1/1991 |
| EP | 0955277 A1 | 11/1999 |
| GB | 941399 A | 11/1963 |
| GB | 1028890 | 5/1966 |
| GB | 1250713 | 10/1971 |
| GB | 1381457 A | 1/1975 |
| GB | 1504929 A | 3/1978 |
| GB | 2053779 A | 2/1981 |
| JP | 05-293350 A | 11/1993 |
| JP | 08-231258 A | 9/1996 |
| JP | 09-165244 A | 6/1997 |
| JP | 2001-504795 | 4/2001 |
| JP | 2003-020262 A | 1/2003 |
| JP | 2003-531096 T | 10/2003 |
| KR | 1020060123582 A | 12/2006 |
| KZ | 19098 A | 2/2008 |
| RU | 2215708 C2 | 11/2003 |

| | | |
|---|---|---|
| SU | 885178 A | 11/1981 |
| SU | 887506 A | 12/1981 |
| UA | 27041 C1 | 2/2000 |
| UA | 52047 A | 12/2002 |
| UA | 88764 C2 | 11/2009 |
| WO | 95/31415 A1 | 11/1995 |
| WO | 99/08978 A1 | 2/1999 |
| WO | 99/08979 A1 | 2/1999 |
| WO | 00/06518 | 2/2000 |
| WO | 01/34534 A2 | 5/2001 |
| WO | 01/45932 A1 | 6/2001 |
| WO | 01/81263 A1 | 11/2001 |
| WO | 01/81264 | 11/2001 |
| WO | 03/000620 A1 | 1/2003 |
| WO | 03/040055 A1 | 5/2003 |
| WO | 03/053878 A1 | 7/2003 |
| WO | 03/082766 A1 | 10/2003 |
| WO | 2004/002916 A1 | 1/2004 |
| WO | 2004/033581 A1 | 4/2004 |
| WO | WO 2004/033581 A1 | 4/2004 |
| WO | 2004-039749 A1 | 5/2004 |
| WO | WO 2004/061042 A1 | 7/2004 |
| WO | 2004/083146 A2 | 9/2004 |
| WO | 2005/080294 A1 | 9/2005 |
| WO | 2006/135707 A2 | 6/2006 |
| WO | WO 2006/071116 A1 | 7/2006 |
| WO | WO 2006/135613 A2 | 12/2006 |
| WO | WO 2006/135707 | 12/2006 |
| WO | WO 2006/138273 A2 | 12/2006 |
| WO | 2007/024420 A2 | 3/2007 |

OTHER PUBLICATIONS

Virginia Vermiculite LLC, "Grade No. 45 Vermiculite Concentrate", VA, USA (Jan. 2008).

Camp, T.F., "The Manufacture of Gypsum Board", Chapter III, Section II, The Manufacture and Technology of Gypsum Products, Dec. 22, 1950.

Petertson, Kurt, "Engineered Gypsum Panels, the Development and Application of Densified Zones at the Paper/ Core Interface of Gypsum Panels", Proceedings of Gypsum 2000, 6th International Conference on Natural and Synthetic Gypsum, Toronto, Canada, May 2000, pp. 9-1-9-16.

Allen, "Computed Tomography of the Antikythera Mechanism," Abstracts of 5th World Congress on Industrial Process Tomography, Bergen, Norway, Sep. 6, 2007, Abstract No. P04, p. 88.

Alme et al., "3D Reconstruction of 10000 Particle Trajectories in Real-time", Abstracts of 5th World Congress on Industrial Process Tomography, Bergen, Norway, Sep. 6, 2007, Abstract No. VIA05, p. 91.

Banasiak et al., "Application of Charge Simulation Method (CSM) for ECT Imaging in Forward Problem and Sensitivity Matrix Calculation", Abstracts of 5th World Congress on Industrial Process Tomography, Bergen, Norway, Sep. 6, 2007, Abstract No. VIA02, p. 89.

Blaine, "Accelerating the hydration of calcium sulfate hemihydrate via high energy mixing," Materials and Structures, Jul. 1997, 30:362-365.

Henein, The Development of a Novel Foam Batching and Generating System, Jun. 1977, Masters Thesis, Concordia University, Montreal, Quebec, Canada.

Hyonic® PFM33 Products Bulletin, "Zero VOC Foaming Agent for Gypsum Wallboard", GEO Specialty Chemicals, Horsham, PA (Jul. 2000).

Janaszewski et al., Adaptive 3D Algorithm to Detect Bridging Ligaments during Intergranular Stress Corrosion Cracking of Stainless Steel Abstracts of 5th World Congress on Industrial Process Tomography, Bergen, Norway, Abstract No. VIA03, p. 90 (Sep. 6, 2007).

Li et al., "Updating Sensitivity Maps in Landweber Iteration for Electrical Capacitance Tomography" Abstracts of 5th World Congress on Industrial Process Tomography, Bergen, Norway, Abstract No. VIA04, p. 90 (Sep. 6, 2007).

Lin et al., "Characterization and Analysis of Porous, brittle Solid Structures by Micro CT" Abstracts of 5th World Congress on Industrial Process Tomography, Bergen, Norway, paper No. VIA07, p. 92 (Sep. 6, 2007).

Maad et al., "Comparing Analysis of Image Visualisation Accuracy of Electrical Capacitance Tomography and Gamma Tomography" Abstracts of 5th World Congress on Industrial Process Tomography, Bergen, Norway, Abstract No. VIA01, p. 89 (Sep. 6, 2007).

Xiong et al., "Wavelet Enhanced Visualisation and Solids Distribution in the Top of Circulating Fluidized Beds" Abstracts of 5th World Congress on Industrial Process Tomography, Bergen, Norway, Abstract No. VIA06, p. 91 (Sep. 6, 2007).

"Standard Test Methods for Physical Testing of Gypsum Panel Products", Annual Book of ASTM Standards, Designations: C 473—97, vol. 04.01 1998, pp. 253-264.

Diloflo® GW Products Bulletin, "Polynaphthalene Sulfonate, Sodium Salt", GEO Specialty Chemicals, Horsham, PA (Nov. 1999).

EP 1008568 (Jun. 14, 2000) Reisch et al. abstract only.

CN 1396138 (Feb. 12, 2003) Li et al. abstract only.

AT 406048 (Jan. 25, 2000) Cement Intellectual Property LTD Bermuda abstract only.

CN 1238312 (Dec. 15, 1999) Cao abstract only.

EP 335405 (Oct. 4, 1989) Contento et al. abstract only.

FR 2673620 (Sep. 11, 1992) Boussouira et al. abstract only.

DE 4316518 (Nov. 24, 1994) Riemann et al. abstract only.

NO 126524 (Feb. 19, 1973) Pran abstract only.

U.S. Appl. No. 08/916,058, dated Aug. 21, 1997, Yu.

U.S. Appl. No. 13/027,944, dated Feb. 15, 2011, Yu et al.

Burrows, "A Decade's Experience of Gypsum Board Weight Reduction in the U.S.", 14. Internationale Baustofftagung (Weimar, Sep. 20-23, 2000), 1.0197-1.0207.

Card, J.: "Production of Lightweight Wallboard", Global Gypsum, Mar. 1999, p. 17.

Englert, et al., "Properties of Gypsum Fiberboard Made by the USG Process", Proceedings of the 4th International Inorganic-Bonded Wood & Fiber Composite Materials Conference, Sep. 25-28, 1994, Spokane, WA, A.A. Moslemi ed., 1995, 4:52-58.

Geo Specialty Chemicals, Aero Technology, Jan. 14, 2002, two pages.

Hannant, D.J. et al.; Polyolefin Fibrous Networks in Cement Matrices for Low Cost Sheeting; Phil. Trans. R. Soc. Land; 1980; pp. 591-597; A 294; Civil Engineering Department Univ. of Surrey, Guildford, Surrey GU2 5XH, U.K.

K.F.Mikhaylov—Manual for manufacturing prefabricated reinforced concrete articles, Moscow, Stroyizdat, 1982, pp. 42,44.

Karni, J.; Thin Gypsum Panels; Materiaux et Constructions; 1980; pp. 383-389; vol. 13, No. 77; Bordas-Dunod; Israel.

Miller, et al., "Commercial Scale-Up Experience with USG's Gypsum Fiberboard Process", Proceedings of the 7th International Inorganic-Bonded Wood & Fiber Composite Materials Conference, Sun Valley, ID, A.A. Moslemi ed., 2000, 7:337-355.

Miller, et al., "Development and Scale-Up of USG's Gypsum Fiberboard Technology", Proceedings of the 6th International Inorganic-Bonded Wood & Fiber Composite Materials Conference, Sun Valley, ID, A.A. Moslemi, ed., 1998, 6:4-12.

Miller, et al., "USG Process for Manufacturing Fiber Composite Panels", International Cement Review, Nov. 1995, pp. 41-42.

Miller, et al., "USG Process for Manufacturing Gypsum Fiber Composite Panels" Proceedings of the 4th International Inorganic-Bonded Wood & Fiber Composite Materials Conference, Sep. 25-28, 1994, Spokane, WA, A.A. Moslemi ed., 1995, 4:47-51.

Olson, G,B.: "Computational Design of Hierarchically Structured Materials", Science, vol. 277, p. 1237 (1997).

Ratinov, V.B. et al. Dobavki v beton (Concrete Admixtures), in Russian, ISBN 5274005667/9785274005661/5-274-00566-7, Moscow, Stroyizdat, 1989, pp. 20, 21, 105-110.

Salyer, et al., "Utilization of Bagasse in New Composite Building Materials", Ind. Eng. Chem. Prod. Res. Dev. 1982; pp. 17-23; 21; Center for Basic and Applied Polymer Research, Univ. of Dayton, OH 45469.

Ship et al., "Thermophysical Characterization of Type X Special Fire Resistant Gypsum Board", Proceedings of the Fire and Materials 2011 Conference, San Francisco, Jan. 31-Feb. 2, 2011, Interscience Communications Ltr., London, UK, p. 417-426.

Van Wazer, Phosphorus and Its Compounds, vol. 1, Interscience Publishers, Inc., New York (1958), pp. 419-427 and pp. 6799-6795.

Videla, et al., "Watershed Functions Applied to a 3D Segmentation Problem for the Analysis of Packed Particle Beds", Part. Part. Syst. Charact. 23 (2006) 237-245. DOI:10.1002/ppsc.200601055, Weinheim.

Weber, Charles, G., "Fiber Building Boards Their Manufacture and Use", Industrial and Engineering Chemistry; Aug. 1935; 27 (8): 896-898; National Bureau of Standards, Washington, D.C.

Grodzka, P. et al.; On the Development of Heat Storage Building Materials; Conf-820814-23; DE82 020814; Aug. 1, 1982; Library of Congress Newspaper RM.

Ockerman, Food Science Sourcebook, Second Edition, Part 1, Terms and Descriptions, 1991, pp. 477, 595, 722, New York, NY.

Ullmann's Encyclopedia of Industrial Chemistry, 5th Edition, vol. A4, "Calcium Sulfate" Wirsching, Franz, Dec. 20, 1985, pp. 1, 15.

HIGH STARCH LIGHT WEIGHT GYPSUM WALLBOARD

This application is a continuation of U.S. patent application Ser. No. 11/449,177, filed Jun. 7, 2006, now U.S. Pat. No. 7,731,794 which claims priority to U.S. Provisional Patent Application No. 60/688,839, filed Jun. 9, 2005, the entire contents of which are incorporated herein by reference.

FIELD OF THE INVENTION

This invention pertains to a method making gypsum slurries containing a pregelatinized starch and a naphthalenesulfonate dispersant, and products made therefrom. It also pertains to a method of increasing dry strength of gypsum-containing products including wallboard by using a naphthalenesulfonate dispersant in combination with pregelatinized starch in the slurry used to make the products.

BACKGROUND OF THE INVENTION

Certain properties of gypsum (calcium sulfate dihydrate) make it very popular for use in making industrial and building products, such as gypsum wallboard. Gypsum is a plentiful and generally inexpensive raw material which, through a process of dehydration and rehydration, can be cast, molded or otherwise formed into useful shapes. The base material from which gypsum wallboard and other gypsum products are manufactured is the hemihydrate form of calcium sulfate ($CaSO_4 \cdot 1/2H_2O$), commonly termed "stucco," which is produced by heat conversion of the dihydrate form of calcium sulfate ($CaSO_4 \cdot 2H_2O$), from which 1½ water molecules been removed.

Conventional gypsum-containing products such as gypsum wallboard have many advantages, such as low cost and easy workability, although substantial amounts of gypsum dust can be generated when the products are cut or drilled. Various improvements have been achieved in making gypsum-containing products using starches as ingredients in the slurries used to make such products. Starch can increase flexural strength and compressive strength of gypsum-containing products including gypsum wallboard. Known gypsum wallboard contains board starch at levels of less than about 10 lbs/MSF.

It is also necessary to use substantial amounts of water in gypsum slurries containing pregelatinized starch in order to ensure proper flowability of the slurry. Unfortunately, most of this water must eventually be driven off by heating, which is expensive due to the high cost of the fuels used in the heating process. The heating step is also time-consuming. It has been found that the use of naphthalenesulfonate dispersants can increase the fluidity of the slurries, thus overcoming the water demand problem. In addition, it has also been found that the naphthalenesulfonate dispersants, if the usage level is high enough, can cross-link to the pregelatinized starch to bind the gypsum crystals after drying, thus increasing dry strength of the gypsum composite. Trimetaphosphate salts have not in the past been recognized to affect gypsum slurry water requirements. However, the present inventors have discovered that increasing the level of the trimetaphosphate salt to hitherto unknown levels in the presence of a specific dispersant makes it possible to achieve proper slurry flowability with unexpectedly reduced amounts of water, even in the presence of high starch levels. This, of course, is highly desirable because it in turn reduces fuel usage as well as the process time associated with subsequent water removal process steps. Thus the present inventors have also discovered that the dry strength of gypsum board can be increased by using a naphthalenesulfonate dispersant in combination with pregelatinized starch in the slurry used to make the wallboard.

BRIEF SUMMARY OF THE INVENTION

The invention generally comprises a slurry including stucco, naphthalenesulfonate dispersant, and pregelatinized starch. The naphthalenesulfonate dispersant is present in an amount of about 0.1%-3.0% by weight based on the weight of dry stucco. The pregelatinized starch is present in an amount of at least about 0.5% by weight up to about 10% by weight based on the weight of dry stucco in the formulation. Other slurry additives can include accelerators, binders, paper or glass fibers and other known constituents. The invention also comprises the gypsum-containing products made with such slurries.

The invention also comprises a slurry including stucco, trimetaphosphate salt, naphthalenesulfonate dispersant, and pregelatinized starch. The sodium trimetaphosphate is present in an amount of at least about 0.12% by weight based on the weight of stucco. In a preferred embodiment, the trimetaphosphate salt is present in an amount of about 0.12-0.4% by weight based on the weight of dry stucco. The naphthalenesulfonate dispersant is present in an amount of about 0.1%-3.0% by weight based on the weight of dry stucco. The pregelatinized starch is present in an amount of at least about 0.5% by weight up to about 10% by weight based on the weight of dry stucco in the formulation. Other slurry additives can include accelerators, binders, paper or glass fibers and other known constituents. The invention also comprises the gypsum-containing products made with such slurries.

A preferred gypsum-containing product is gypsum wallboard. In this embodiment, the invention constitutes gypsum wallboard comprising a set gypsum composition formed between two substantially parallel cover sheets, the set gypsum composition made using the gypsum-containing slurry of water, stucco, pregelatinized starch, and a naphthalenesulfonate dispersant. The gypsum-containing slurry can optionally contain a trimetaphosphate salt, for example, sodium trimetaphosphate. This gypsum wallboard made in accordance with the invention has a high strength, yet much lower weight than conventional boards. In addition, much less dust is generated on cutting, sawing, snapping, or drilling the wallboards made according to this embodiment.

In another embodiment the invention constitutes a method of making gypsum wallboard by mixing a gypsum-containing slurry comprising water, stucco, pregelatinized starch, and a naphthalenesulfonate dispersant, wherein the pregelatinized starch is present in an amount of at least about 0.5% by weight up to about 10% by weight based on the weight of stucco. The resulting gypsum-containing slurry is deposited on a first paper cover sheet, and a second paper cover sheet is placed over the deposited slurry to form a gypsum wallboard. The gypsum wallboard is cut after the gypsum-containing slurry has hardened sufficiently for cutting, and the resulting gypsum wallboard is dried. The gypsum-containing slurry can optionally contain a trimetaphosphate salt, for example, sodium trimetaphosphate. Other conventional ingredients will also be used in the slurry including, as appropriate, accelerators, binders, paper fiber, glass fiber, and other known ingredients. A soap foam is normally added to reduce the density of the final gypsum wallboard product.

DETAILED DESCRIPTION OF THE INVENTION

According to one embodiment of the present invention, there are provided finished gypsum-containing products made from gypsum-containing slurries containing stucco, pregelatinized starch, and a naphthalenesulfonate dispersant. The naphthalenesulfonate dispersant is present in an amount of about 0.1%-3.0% by weight based on the weight of dry stucco. The pregelatinized starch is present in an amount of at least about 0.5% by weight up to about 10% by weight based on the weight of dry stucco in the formulation. Other ingredients that may be used in the slurry include binders, paper fiber, glass fiber, and accelerators. A soap foam is normally added to the newly formulated gypsum-containing slurries to reduce the density of the final gypsum-containing product, for example, gypsum wallboard.

Optionally, the combination of from about 0.5% by weight up to about 10% by weight pregelatinized starch, from about 0.1% by weight up to about 3.0% by weight naphthalenesulfonate dispersant, and a minimum of at least about 0.12% by weight up to about 0.4% by weight of trimetaphosphate salt (all based on the weight of dry stucco used in the gypsum slurry) unexpectedly and significantly increases the fluidity of the gypsum slurry. This substantially reduces the amount of water required to produce a gypsum slurry with sufficient flowability to be used in making gypsum-containing products such as gypsum wallboard. The level of trimetaphosphate salt, which is at least about twice that of standard formulations (as sodium trimetaphosphate), is believed to boost the dispersant activity of the naphthalenesulfonate dispersant.

The naphthalenesulfonate dispersants used in the present invention include polynaphthalenesulfonic acid and its salts (polynaphthalenesulfonates) and derivatives, which are condensation products of naphthalenesulfonic acids and formaldehyde. Particularly desirable polynaphthalenesulfonates include sodium and calcium naphthalenesulfonate. The average molecular weight of the naphthalenesulfonates can range from about 3,000 to 27,000, although it is preferred that the molecular weight be about 8,000 to 10,000. At a given solid % aqueous solution, a higher molecular weight dispersant has higher viscosity, and generates a higher water demand in the formulation, than a lower molecular weight dispersant. Useful naphthalenesulfonates include DILOFLO, available from GEO Specialty Chemicals, Cleveland, Ohio; DAXAD, available from Hampshire Chemical Corp., Lexington, Mass.; and LOMAR D, available from GEO Specialty Chemicals, Lafayette, Ind. The naphthalenesulfonates are preferably used as aqueous solutions in the range 35-55% by weight solids content, for example. It is most preferred to use the naphthalenesulfonates in the form of an aqueous solution, for example, in the range of about 40-45% by weight solids content. Alternatively, where appropriate, the naphthalenesulfonates can be used in dry solid or powder form, such as LOMAR D, for example.

The polynaphthalenesulfonates useful in the present invention have the general structure (I):

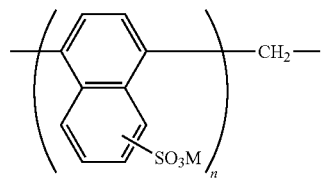

wherein n is >2, and wherein M is sodium, potassium, calcium, and the like.

The naphthalenesulfonate dispersant, preferably as an about 45% by weight solution in water, may be used in a range of from about 0.5% to about 3.0% by weight based on the weight of dry stucco used in the gypsum composite formulation. A more preferred range of naphthalenesulfonate dispersant is from about 0.5% to about 2.0% by weight based on the weight of dry stucco, and a most preferred range from about 0.7% to about 2.0% by weight based on the weight of dry stucco. In contrast, known gypsum wallboard contains this dispersant at levels of about 0.4% by weight, or less, based on the weight of dry stucco.

Stated in an another way, the naphthalenesulfonate dispersant, on a dry weight basis, may be used in a range from about 0.1% to about 1.5% by weight based of the weight of dry stucco used in the gypsum composite formulation. A more preferred range of naphthalenesulfonate dispersant, on a dry solids basis, is from about 0.25% to about 0.7% by weight based on the weight of dry stucco, and a most preferred range (on a dry solids basis) from about 0.3% to about 0.7% by weight based on the weight of dry stucco.

The gypsum-containing slurry can optionally contain a trimetaphosphate salt, for example, sodium trimetaphosphate. Any suitable water-soluble metaphosphate or polyphosphate can be used in accordance with the present invention. It is preferred that a trimetaphosphate salt be used, including double salts, that is trimetaphosphate salts having two cations. Particularly useful trimetaphosphate salts include sodium trimetaphosphate, potassium trimetaphosphate, calcium trimetaphosphate, sodium calcium trimetaphosphate, lithium trimetaphosphate, ammonium trimetaphosphate, and the like, or combinations thereof. A preferred trimetaphosphate salt is sodium trimetaphosphate. It is preferred to use the trimetaphosphate salt as an aqueous solution, for example, in the range of about 10-15% by weight solids content. Other cyclic or acyclic polyphosphates can also be used, as described in U.S. Pat. No. 6,409,825 to Yu et al., herein incorporated by reference.

Sodium trimetaphosphate is a known additive in gypsum-containing compositions, although it is generally used in a range of from about 0.05% to about 0.08% by weight based on the weight of dry stucco used in the gypsum slurry. In the embodiments of the present invention, sodium trimetaphosphate (or other water-soluble metaphosphate or polyphosphate) can be present in the range of from about 0.12% to about 0.4% by weight based on the weight of dry stucco used in the gypsum composite formulation. A preferred range of sodium trimetaphosphate (or other water-soluble metaphosphate or polyphosphate) is from about 0.12% to about 0.3% by weight based on the weight of dry stucco used in the gypsum composite formulation.

There are two forms of stucco, alpha and beta. These two types of stucco are produced by different means of calcination. In the present inventions either the beta or the alpha form of stucco may be used.

Starches, including pregelatinized starch in particular, must be used in gypsum-containing slurries prepared in accordance with the present invention. A preferred pregelatinized starch is pregelatinized corn starch, for example pregelatinized corn flour available from Bunge Milling, St. Louis, Mo., having the following typical analysis: moisture 7.5%, protein 8.0%, oil 0.5%, crude fiber 0.5%, ash 0.3%; having a green strength of 0.48 psi; and having a loose bulk density of 35.0 lb/ft$^3$. Pregelatinized corn starch should be used in an amount of at least about 0.5% by weight up to about 10% by weight, based on the weight of dry stucco used in the gypsum-containing slurry.

The present inventors have further discovered that an unexpected increase in dry strength (particularly in wallboard) can be obtained by using at least about 0.5% by weight up to about 10% by weight pregelatinized starch (preferably pregelatinized corn starch) in the presence of about 0.1% by weight to 3.0% by weight naphthalenesulfonate dispersant (starch and naphthalenesulfonate levels based on the weight of dry stucco present in the formulation). This unexpected result can be obtained whether or not water-soluble metaphosphate or polyphosphate is present.

In addition, it has unexpectedly been found that pregelatinized starch can be used at levels of at least about 10 lb/MSF, or more, in the dried gypsum wallboard made in accordance with the present invention, yet high strength and low weight can be achieved. Levels as high as 35-45 lb/MSF pregelatinized starch in the gypsum wallboard have been shown to be effective. As an example, Formulation B, as shown in Tables 1 and 2 below, includes 45 lb/MSF, yet produced a board weight of 1042 lb/MSF having excellent strength. In this example (Formulation B), a naphthalenesulfonate dispersant as a 45% by weight solution in water, was used at a level of 1.28% by weight.

Other useful starches include acid-modified starches, such as acid-modified corn flour, available as HI-BOND from Bunge Milling, St. Louis, Mo. This starch has the following typical analysis: moisture 10.0%, oil 1.4%, solubles 17.0%, alkaline fluidity 98.0%, loose bulk density 30 lb/ft$^3$, and a 20% slurry producing a pH of 4.3. Another useful starch is non-pregelatinized wheat starch, such as ECOSOL-45, available from ADM/Ogilvie, Montreal, Quebec, Canada.

A further unexpected result may be achieved with the present invention when the naphthalenesulfonate dispersant trimetaphosphate salt combination is combined with pregelatinized corn starch, and optionally, paper fiber or glass fiber. Gypsum wallboard made from formulations containing these three ingredients have increased strength and reduced weight, and are more economically desirable due to the reduced water requirements in their manufacture.

Accelerators can be used in the gypsum-containing compositions of the present invention, as described in U.S. Pat. No. 6,409,825 to Yu et al., herein incorporated by reference. One desirable heat resistant accelerator (HRA) can be made from the dry grinding of landplaster (calcium sulfate dihydrate). Small amounts of additives (normally about 5% by weight) such as sugar, dextrose, boric acid, and starch can be used to make this HRA. Sugar, or dextrose, is currently preferred. Another useful accelerator is "climate stabilized accelerator" or "climate stable accelerator," (CSA) as described in U.S. Pat. No. 3,573,947, herein incorporated by reference.

The following examples further illustrate the invention. They should not be construed as in any way limiting the scope of the invention.

EXAMPLE 1

Sample Gypsum Slurry Formulations

Gypsum slurry formulations are shown in Table 1 below. All values in Table 1 are expressed as weight percent based on the weight of dry stucco. Values in parentheses are dry weight in pounds (lb/MSF).

TABLE 1

| Component | Formulation A | Formulation B |
|---|---|---|
| Stucco (lb/MSF) | (732) | (704) |
| sodium trimetaphosphate | 0.20 (1.50) | 0.30 (2.14) |
| Dispersant (naphthalenesulfonate) | 0.18 (1.35) | 0.58[1] (4.05) |
| Pregelatinized starch (dry powder) | 2.7 (20) | 6.4 (45) |
| Board starch | 0.41 (3.0) | 0 |
| Heat resistant accelerator (HRA) | (15) | (15) |
| Glass fiber | 0.27 (2.0) | 0.28 (2.0) |
| Paper fiber | 0 | 0.99 (7.0) |
| Soap* | 0.03 (0.192) | 0.03 (0.192) |
| Total Water (lb.) | 805 | 852 |
| Water/Stucco ratio | 1.10 | 1.21 |

*Used to pregenerate foam.
[1] 1.28% by weight as a 45% aqueous solution.

EXAMPLE 2

Preparation of Wallboards

Sample gypsum wallboards were prepared in accordance with U.S. Pat. Nos. 6,342,284 to Yu et al. and 6,632,550 to Yu et al., herein incorporated by reference. This includes the separate generation of foam and introduction of the foam into the slurry of the other ingredients as described in Example 5 of these patents.

Test results for gypsum wallboards made using the Formulations A and B of Example 1, and a control are shown in Table 2 below. As in this example and other examples below, nail pull resistance, core hardness, and flexural strength tests were performed according to ASTM C-473. Additionally, it is noted that typical gypsum wallboard is approximately ½ inch thick and has a weight of between about 1600 to 1800 pounds per 1,000 square feet of material, or lb/MSF. ("MSF" is a standard abbreviation in the art for a thousand square feet; it is an area measurement for boxes, corrugated media and wallboard.)

TABLE 2

| Lab test result | Control Board | Formulation A Board | Formulation B Board |
|---|---|---|---|
| Board weight (lb/MSF) | 1587 | 1066 | 1042 |
| Nail pull resistance (lb) | 81.7 | 50.2 | 72.8 |
| Core hardness (lb) | 16.3 | 5.2 | 11.6 |
| Humidified bond load (lb) | 17.3 | 20.3 | 15.1 |
| Humidified bond failure (%) | 0.6 | 5 | 11.1 |
| Flexural strength, face-up (MD) (lb) | 47 | 47.2 | 52.6 |
| Flexural strength, face-down (MD) (lb) | 51.5 | 66.7 | 78.8 |
| Flexural strength, face-up (XMD) (lb) | 150 | 135.9 | 173.1 |
| Flexural strength, face-down (XMD) (lb) | 144.4 | 125.5 | 165.4 |

MD: machine direction
XMD: across machine direction

As illustrated in Table 2, gypsum wallboards prepared using the Formulation A and B slurries have significant reductions in weight compared to the control board. With reference again to Table 1, the comparisons of the Formulation A board to the Formulation B board are most striking. The water/stucco (w/s) ratios are similar in Formulation A and Formulation B. A significantly higher level of naphthalenesulfonate dispersant is also used in Formulation B. Also, in Formulation B substantially more pregelatinized starch was used, about 6% by weight, a greater than 100% increase over Formulation A accompanied by marked strength increases. Even so, the water demand to produce the required flowability remained low in the Formulation B slurry, the difference being about 10% in comparison to Formulation A. The low water demand in both Formulations is attributed to the synergistic effect of the combination of naphthalenesulfonate dispersant and sodium trimetaphosphate in the gypsum slurry, which increases the fluidity of the gypsum slurry, even in the presence of a substantially higher level of pregelatinized starch.

As illustrated in Table 2, the wallboard prepared using the Formulation B slurry has substantially increased strength compared with the wallboard prepared using the Formulation A slurry. By incorporating increased amounts of pregelatinized starch in combination with increased amounts of naphthalenesulfonate dispersant and sodium trimetaphosphate, nail pull resistance in the Formulation B board improved by 45% over the Formulation A board. Substantial increases in flexural strength were also observed in the Formulation B board as compared to the Formulation A board.

EXAMPLE 3

½ Inch Gypsum Wallboard Weight Reduction Trials

Further gypsum wallboard examples (Boards C, D and E), including slurry formulations and test results are shown in Table 3 below. The slurry formulations of Table 3 include the major components of the slurries. Values in parentheses are expressed as weight percent based on the weight of dry stucco.

EXAMPLE 4

Wet Gypsum Cube Strength Test

The wet cube strength tests were carried out by using Southard CKS board stucco, available from United States Gypsum Corp., Chicago, Ill. and tap water in the laboratory to determine their wet compressive strength. The following lab test procedure was used.

Stucco (1000 g), CSA (2 g), and tap water (1200 cc) at about 70° F. were used for each wet gypsum cube cast. Pregelatinized corn starch (20 g, 2.0% based on stucco wt.) and CSA (2 g, 0.2% based on stucco wt.) were thoroughly dry mixed first in a plastic bag with the stucco prior to mixing with a tap water solution containing both naphthalenesulfonate dispersant and sodium trimetaphosphate. The dispersant used was DILOFLO dispersant (1.0-2.0%, as indicated in Table 4). Varying amounts of sodium trimetaphosphate were used also as indicated in Table 4.

The dry ingredients and aqueous solution were initially combined in a laboratory Warning blender, the mixture produced allowed to soak for 10 sec, and then the mixture was mixed at low speed for 10 sec in order to make the slurry. The slurries thus formed were cast into three 2"X2"X2" cube molds. The cast cubes were then removed from the molds, weighed, and sealed inside plastic bags to prevent moisture loss before the compressive strength test was performed. The compressive strength of the wet cubes was measured using an ATS machine and recorded as an average in pounds per square inch (psi). The results obtained were as follows:

TABLE 3

|  | Control Board | Formulation C Board | Formulation D Board | Formulation E Board |
|---|---|---|---|---|
| Trial formulation component/parameter |  |  |  |  |
| Dry stucco (lb/MSF) | 1300 | 1281 | 1196 | 1070 |
| Accelerator (lb/MSF) | 9.2 | 9.2 | 9.2 | 9.2 |
| DILOFLO[1] (lb/MSF) | 4.1 (0.32%) | 8.1 (0.63%) | 8.1 (0.68%) | 8.1 (0.76%) |
| Regular starch (lb/MSF) | 5.6 (0.43%) | 0 | 0 | 0 |
| Pregelatinized corn starch (lb/MSF) | 0 | 10 (0.78%) | 10 (0.84%) | 10 (0.93%) |
| Sodium trimetaphosphate (lb/MSF) | 0.7 (0.05%) | 1.6 (0.12%) | 1.6 (0.13%) | 1.6 (0.15%) |
| Total water/stucco ratio (w/s) | 0.82 | 0.82 | 0.82 | 0.84 |
| Trial formulation test results |  |  |  |  |
| Dry board weight (lb/MSF) | 1611 | 1570 | 1451 | 1320 |
| Nail pull resistance (lb) | 77.3† | 85.5 | 77.2 | 65.2 |

†ASTM standard: 77 lb
[1]DILOFLO is a 45% Naphthalensulfonate solution in water

As illustrated in Table 3, Boards C, D, and E were made from a slurry having substantially increased amounts of starch, DILOFLO dispersant, and sodium trimetaphosphate in comparison with the control board (about a two-fold increase on a percentage basis for the starch and dispersant, and a two- to three-fold increase for the trimetaphosphate), while maintaining the w/s ratio constant. Nevertheless, strength as measured by nail pull resistance was not dramatically affected and board weight was significantly reduced. Therefore, in this example of an embodiment of the invention, the new formulation (such as, for example, Board D) can provide increased starch formulated in a usable, flowable slurry, while maintaining adequate strength.

TABLE 4

| Test Sample No. | Sodium trimetaphosphate, grams (wt % based on dry stucco) | DILOFLO [1] (wt % based on dry stucco) | Wet cube weight (2" × 2" × 2"), g | Wet cube compressive strength, psi |
|---|---|---|---|---|
| 1 | 0 | 1.5 | 183.57 | 321 |
| 2 | 0.5 (0.05) | 1.5 | 183.11 | 357 |
| 3 | 1 (0.1) | 1.5 | 183.19 | 360 |
| 4 | 2 (0.2) | 1.5 | 183.51 | 361 |
| 5 | 4 (0.4) | 1.5 | 183.65 | 381 |
| 6 | 10 (1.0) | 1.5 | 183.47 | 369 |
| 7 | 0 | 1.0 | 184.02 | 345 |
| 8 | 0.5 (0.05) | 1.0 | 183.66 | 349 |

TABLE 4-continued

| Test Sample No. | Sodium trimetaphosphate, grams (wt % based on dry stucco) | DILOFLO [1] (wt % based on dry stucco) | Wet cube weight (2" × 2" × 2"), g | Wet cube compressive strength, psi |
|---|---|---|---|---|
| 9 | 1 (0.1) | 1.0 | 183.93 | 356 |
| 10 | 2 (0.2) | 1.0 | 182.67 | 366 |
| 11 | 4 (0.4) | 1.0 | 183.53 | 365 |
| 12 | 10 (1.0) | 1.0 | 183.48 | 341 |
| 13 | 0 | 2.0 | 183.33 | 345 |
| 14 | 0.5 (0.05) | 2.0 | 184.06 | 356 |
| 15 | 1 (0.1) | 2.0 | 184.3 | 363 |
| 16 | 2 (0.2) | 2.0 | 184.02 | 363 |
| 17 | 4 (0.4) | 2.0 | 183.5 | 368 |
| 18 | 10 (1.0) | 2.0 | 182.68 | 339 |

[1] DILOFLO is a 45% Naphthalensulfonate solution in water

As illustrated in Table 4, Samples 4-5, 10-11, and 17, having levels of sodium trimetaphosphate in the about 0.12-0.4% range of the present invention generally provided superior wet cube compressive strength as compared to samples with sodium trimetaphosphate outside this range.

EXAMPLE 5

½ Inch Light Weight Gypsum Wallboard Plant Production Trials

Further trials were performed (Trial Boards 1 and 2), including slurry formulations and test results are shown in Table 5 below. The slurry formulations of Table 5 include the major components of the slurries. Values in parentheses are expressed as weight percent based on the weight of dry stucco.

As illustrated in Table 5, Trial Boards 1 and 2 were made from a slurry having substantially increased amounts of starch, DILOFLO dispersant, and sodium trimetaphosphate, while slightly decreasing the w/s ratio, in comparison with the control boards. Nevertheless, strength as measured by nail pull resistance and flexural testing was maintained or improved, and board weight was significantly reduced. Therefore, in this example of an embodiment of the invention, the new formulation (such as, for example, Trial Boards 1 and 2) can provide increased trimetaphosphate and starch formulated in a usable, flowable slurry, while maintaining adequate strength.

EXAMPLE 6

½ Inch Ultra-Light Weight Gypsum Wallboard Plant Production Trials

Further trials were performed (Trial Boards 3 and 4) using Formulation B (Example 1) as in Example 2, except that the pregelatinized corn starch was prepared with water at 10% concentration (wet starch preparation) and a blend of HYONIC PFM soaps (available from GEO Specialty Chemicals, Lafayette, Ind.) was used. For example, Trial Board 3 was prepared with a blend of HYONIC PFM 10/HYONIC PFM 33 ranging from 65-70% by weight/35-30% by weight. For example, Trial Board 4 was prepared with a 70/30 wt./wt. blend of HYONIC PFM 10/HYONIC PFM 33. The trial results are shown in Table 6 below.

TABLE 5

| Trial formulation component/parameter | Control Board 1 | Plant Formulation Trial Board 1 | Control Board 2 | Plant Formulation Trial Board 2 |
|---|---|---|---|---|
| Dry stucco (lb/MSF) | 1308 | 1160 | 1212 | 1120 |
| DILOFLO[1] (lb/MSF) | 5.98 (0.457%) | 7.98 (0.688%) | 7.18 (0.592%) | 8.99 (0.803%) |
| Regular starch (lb/MSF) | 5.0 (0.38%) | 0 | 4.6 (0.38%) | 0 |
| Pregelatinized corn starch (lb/MSF) | 2.0 (0.15%) | 10 (0.86%) | 2.5 (0.21%) | 9.0 (0.80%) |
| Sodium trimetaphosphate (lb/MSF) | 0.7 (0.05%) | 2.0 (0.17%) | 0.6 (0.05%) | 1.6 (0.14%) |
| Total water/stucco ratio (w/s) | 0.79 | 0.77 | 0.86 | 0.84 |
| Trial formulation test results | | | | |
| Dry board weight (lb/MSF) | 1619 | 1456 | 1553 | 1443 |
| Nail pull resistance (lb) | 81.5[†] | 82.4 | 80.7 | 80.4 |
| Flexural strength, average (MD) (lb) | 41.7 | 43.7 | 44.8 | 46.9 |
| Flexural strength, average (XMD) (lb) | 134.1 | 135.5 | 146 | 137.2 |
| Humidified bond[2] load, average (lb) | 19.2 | 17.7 | 20.9 | 19.1 |
| Humidified bond[2,3] failure (%) | 1.6 | 0.1 | 0.5 | 0 |

[†]ASTM standard: 77 lb
MD: machine direction
XMD: across machine direction
[1]DILOFLO is a 45% Naphthalensulfonate solution in water
[2]90° F./90% Relative Humidity
[3]It is well understood that under these test conditions, percentage failure rates <50% are acceptable.

TABLE 6

| Lab test result | Trial Board 3 (Formulation B plus HYONIC soap blend 65/35) (n = 12) | Trial Board 4 (Formulation B plus HYONIC soap blend 70/30) (n = 34)* |
|---|---|---|
| Board weight (lb/MSF) | 1106 | 1013 |
| Nail pull resistance[a] (lb) | 85.5 | 80.3 |
| Core hardness[b] (lb) | >15 | 12.4 |
| Flexural strength, average[c] (MD) (lb) | 55.6 | 60.3[1] |
| Flexural strength, average[d] (XMD) (lb) | 140.1 | 142.3[1] |

*Except as marked.
[1] n = 4
MD: machine direction
XMD: across machine direction
[a] ASTM standard: 77 lb
[b] ASTM standard: 11 lb
[c] ASTM standard: 36 lb
[d] ASTM standard: 107 lb As illustrated in Table 6, strength characteristics as measured by nail pull and core hardness were above the ASTM standard. Flexural strength was also measured to be above the ASTM standard. Again, in this example of an embodiment of the invention, the new formulation (such as, for example, Trial Boards 3 and 4) can provide increased trimetaphosphate and starch formulated in a usable, flowable slurry, while maintaining adequate strength.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A light weight gypsum board comprising:
a set gypsum composition disposed between two cover sheets, the set gypsum composition formed from at least water, stucco, pregelatinized starch, and a naphthalenesulfonate dispersant;
the pregelatinized starch is in an amount from about 0.5% to about 10% by weight based on the weight of the stucco, and the naphthalenesulfonate dispersant is in an amount from about 0.2% to about 3.0% by weight based on the weight of the stucco;
the board has a density of about 34 lb/ft$^3$ or less; and
at a board thickness of about ½ inch, the board has a nail pull resistance of at least about 65 lb, a core hardness of at least about 11 lb, and a flexural strength of at least about 36 lb in a machine direction and/or about 107 lb in a cross-machine direction, the nail pull resistance, the core hardness and the flexural strength determined according to ASTM standard C473.

2. The light weight gypsum board of claim 1, wherein the naphthalenesulfonate dispersant is in an amount from about 0.25% to about 3.0% by weight based on the weight of the stucco.

3. The light weight gypsum board of claim 1, wherein the pregelatinized starch is in an amount from about 0.5% to about 6% by weight based on the weight of the stucco.

4. The light weight gypsum board of claim 3, wherein the pregelatinized starch is in an amount from about 0.5% to about 3% by weight based on the weight of the stucco.

5. The light weight gypsum board of claim 1, wherein the set gypsum composition is further formed from a polyphosphate present in an amount from about 0.12% to about 0.4% by weight based on the weight of the stucco.

6. The light weight gypsum board of claim 1, wherein at a board thickness of about ½ inch, the board has a dry weight from about 1000 lb/MSF to about 1400 lb/MSF.

7. The light weight gypsum board of claim 1, wherein the board has a density from about 24 lb/ft$^3$ to about 34 lb/ft$^3$.

8. The light weight gypsum board of claim 7, wherein at a board thickness of about ½ inch, the board has a nail pull resistance of at least about 72 lb, as determined according to ASTM standard C473.

9. The light weight gypsum board of claim 7, wherein at a board thickness of about ½ inch, the board has a nail pull resistance of at least about 77 lb, as determined according to ASTM standard C473.

10. The light weight gypsum board of claim 7, wherein the pregelatinized starch is in an amount from about 0.5% to about 3% by weight based on the weight of the stucco.

11. The light weight gypsum board of claim 10, having a water to stucco weight ratio from about 0.7 to about 1.2.

12. A light weight gypsum board comprising:
a set gypsum composition disposed between two cover sheets, the set gypsum composition formed from at least water, stucco, starch, and foam;
the starch is in an amount from about 0.5% to about 10% by weight based on the weight of the stucco and effective to increase the core hardness of the gypsum composition relative to the gypsum composition without the starch; and
the board has a board density from about 24 lb/ft$^3$ to about 34 lb/ft$^3$, and at a board thickness of about ½ inch, the board has a core hardness of at least about 11 lb, and at least one of: a nail pull resistance of at least about 65 lb, a flexural strength of at least about 36 lb in a machine direction, and a flexural strength of at least about 107 lb in a cross-machine direction, the core hardness, the nail pull resistance, and the flexural strength determined according to ASTM standard C473.

13. The light weight gypsum board of claim 12, wherein the set gypsum composition is further formed from naphthalene dispersant in an amount from about 0.1% to about 3.0% by weight based on the weight of the stucco.

14. The light weight gypsum board of claim 13, wherein the starch is in an amount from about 0.5% to about 6% by weight based on the weight of the stucco.

15. The light weight gypsum board of claim 12, wherein the starch is a pregelatinized starch and is in an amount from about 0.5% to about 3% by weight based on the weight of the stucco.

16. The light weight gypsum board of claim 12, wherein the set gypsum composition is further formed from a polyphosphate in an amount of at least about 0.12% by weight based on the weight of the stucco.

17. The light weight gypsum board of claim 12, wherein the set gypsum composition is formed from a slurry comprising the water, the stucco, pregelatinized starch, and a naphthalenesulfonate dispersant, the slurry having a wet compressive strength from about 321 psi to about 381 psi when the slurry, exclusive of any foam therein, is cast as a two-inch cube.

18. The light weight gypsum board of claim 12, wherein at a board thickness of about ½ inch, the board has a dry weight from about 1000 lb/MSF to about 1400 lb/MSF.

19. The light weight gypsum board of claim 12, wherein at a board thickness of about ½ inch, the board has a nail pull resistance of at least about 72 lb, a flexural strength of at least about 36 lb in a machine direction, and a flexural strength of at least about 107 lb in a cross-machine direction, the core hardness, the nail pull resistance, and the flexural strength determined according to ASTM standard C473.

20. The light weight gypsum board of claim 12, having a water to stucco weight ratio from about 0.7 to about 1.2.

* * * * *